April 1, 1952 E. G. KOGBETLIANTZ 2,590,979
SYSTEM FOR MEASURING MAGNETIC FIELDS
Filed May 6, 1948 2 SHEETS—SHEET 1
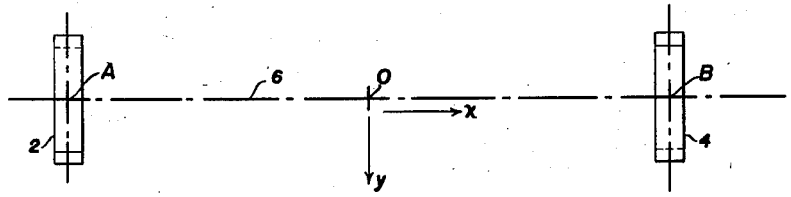
Fig. 1.
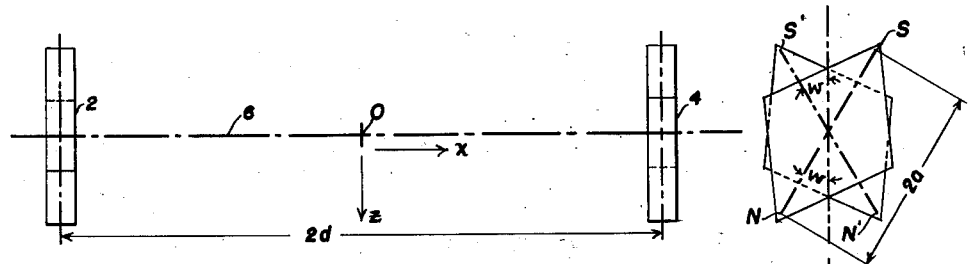
Fig. 2.
Fig. 3.
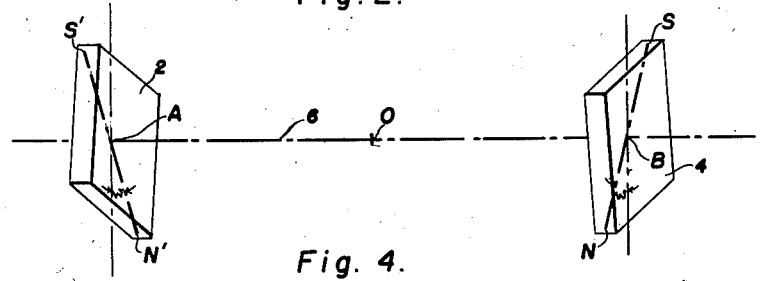
Fig. 4.
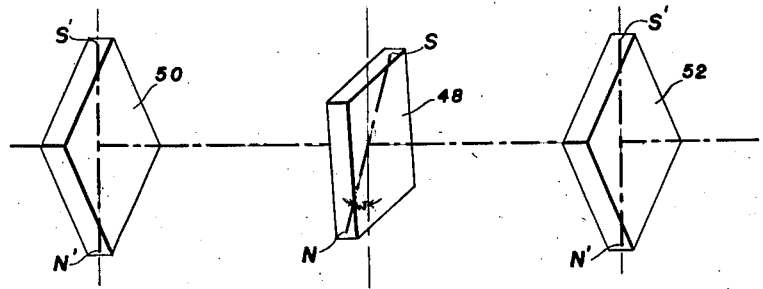
Fig. 8.
INVENTOR.
ERVAND G. KOGBETLIANTZ
BY
ATTORNEYS

INVENTOR.
ERVAND G. KOGBETLIANTZ
BY
ATTORNEYS

Patented Apr. 1, 1952

2,590,979

UNITED STATES PATENT OFFICE 2,590,979

SYSTEM FOR MEASURING MAGNETIC FIELDS

Ervand G. Kogbetliantz, New York, N. Y.

Application May 6, 1948, Serial No. 25,394

10 Claims. (Cl. 175—183)

This invention relates to systems for measuring magnetic fields and includes systems of magnetometer type for measuring total fields or particular components thereof or of the gradiometer or variometer type for measuring changes in magnetic fields or components thereof.

Various systems have been devised for the measurement of magnetic fields, these systems including suspended or mounted magnetic needles, the displacements of which may be accurately determined to give the required measurements. In accordance with the present invention there is adopted a particular type of system, capable of being variously embodied in practice, which involves extreme sensitivity by virtue of operation in a condition approaching that of instability. The various objects of the invention may be best made apparent by consideration of the following description read in conjunction with the accompanying drawings in which:

Figure 1 is a diagram illustrating in plan the arrangement of a pair of magnetic needles in an apparatus embodying the principles of the invention;

Figure 2 is a side elevation of the same;

Figure 3 is an end elevation of the same;

Figure 4 is a perspective view of the same;

Figure 8 is a diagram in perspective showing an arrangement involving three magnetic needles which may be used in accordance with the invention.

Figure 5:
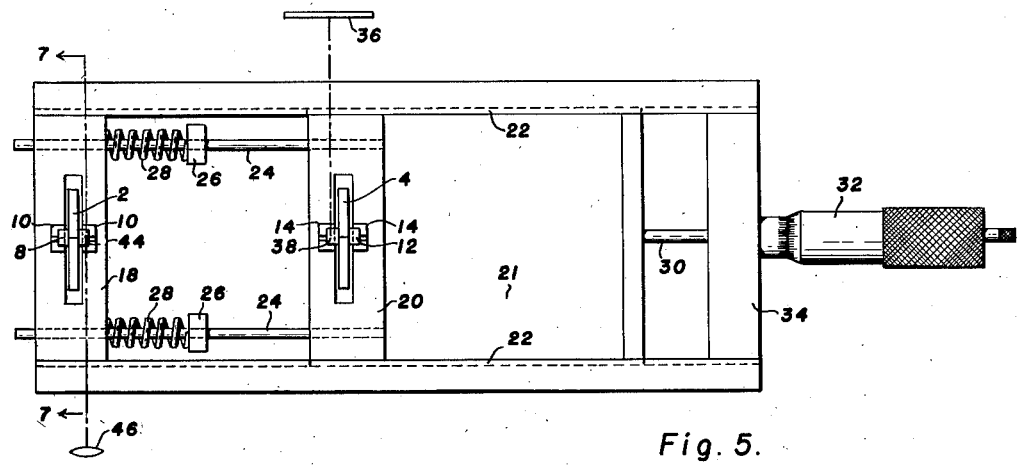
Figure 5 is a plan view showing the method of mounting the needles for relative adjustment.

Referring first to Figures 1 to 4, inclusive, there are illustrated therein two needles 2 and 4 which are mounted to oscillate in parallel planes about a common axis 6. The poles of these needles are indicated at N, S, N' and S' and their centers are indicated at A and B, respectively. For reference it may be considered that the origin is taken at the point O midway between A and B and that the axes of $x$, $y$ and $z$ are taken as indicated in Figures 1 and 2. The distance between the points A and B is $2d$. The magnetic length of each of the needles is $2a$. The magnetic moment of each is $M=2pa$, the strength of a pole being denoted by $p$. The vertical component of the earth's field will be considered Z. As indicated in Figures 3 and 4 the angles between the lines joining the poles and the vertical axis of $z$ are designated $w$. From symmetry of the system it will be obvious that the two needles will be equally inclined to the vertical axis of $z$.

While the needles may have other forms they are desirably as indicated, each being in the form of a rhombus of substantial thickness. A magnet of this type formed of an alloy of iron and tungsten may be made with a magnetic moment of 40 cgs. units per gram of weight. For example, there may be used a rhombus with diagonals measuring 2.4 and 1.7 centimeters with a thickness of 0.3 centimeter for a moment M of 192 cgs. units. The centers of gravity of the needles must be precisely on the axis of rotation so that the needles will be influenced only by the magnetic field under measurement and not by the field of gravity. Assuming first that the vertical component Z is to be measured the axis 6 will be oriented horizontally in the magnetic meridian so that the planes of oscillation of the needles will be perpendicular to the meridian. Under the conditions of operation the like poles of the needles will repulse each other to give the needles positions exaggeratedly indicated in Figure 3.

From the geometry of the system and the forces acting on one of the needles, equilibrium of that needle gives rise to the equation:

(1)
$$4Z \sin w = M \sin 2w(\overline{NN'}^{-3}+\overline{SS'}^{-3}+\overline{SN'}^{-3}+\overline{NS'}^{-3})$$

wherein: M, the magnetic moment of the needle, is $2ap$, $p$ being the pole strength and $2a$ the distance between the poles (see Fig. 3); Z is the vertical component of the earth's field; $w$ is the angle of displacement of the pole axis of the needle from the vertical; and $\overline{NN'}$, etc. are the distances between the indicated poles.

The equilibrium Equation 1 has, obviously, a root $w=0$, corresponding to parallel, vertical needles. This root represents, in the condition of use of the system hereafter described, a condition of unstable equilibrium.

Dividing Equation 1 by sin $w$, substituting for the spacings between the poles their values in terms of $d$, $a$, and $w$, and writing for simplicity of expression $$K=\left(\frac{a}{d}\right)^2$$

there is obtained:

(2)
$$8Z \cdot d^3 = M \cdot \cos w \cdot \left[(1+K\cos^2 w)^{-\frac{3}{2}}+(1+K\sin^2 w)^{-\frac{3}{2}}\right]$$

For such values of the constants as correspond to a real value of $w$ in this equation, the value of $w$ which does exist corresponds to a second equilibrium position for the system. This equilibrium position results when the couple $MZ \cdot \sin w$ caused by the vertical component of the earth's field does not exceed the maximum possible value of the couple caused by interaction of the needles. In particular, this equilibrium can exist only if $d$ is less than some critical value $d_1$, at which value of $d$ the solution of Equation 2 gives $w=0$. This critical value of $d=d_1$ is obtained by solving Equation 2 for $d$ after making $w=0$, and is found to be given by:

$$(3) \quad 2d_1 = \left[\frac{M}{Z} + \sqrt{\left(\frac{M}{Z}\right)^2 + a^6}\right]^{\frac{1}{3}} - \left[-\frac{M}{Z} + \sqrt{\left(\frac{M}{Z}\right)^2 + a^6}\right]^{\frac{1}{3}}$$

For all values of $d$ such that $0 < d < d_1$, the equilibrium will exist to give a working range for the apparatus. It may be noted that for $d \geq d_1$, the position $w=0$ is one of stable equilibrium.

As is common in the case of systems having a critical condition at which two equilibria become confluent, the sensitivity increases without limit as this critical condition is approached. Consequently as $d$ is increased in the present system to approach $d_1$, the sensitivity increases enormously. A close approximation to the sensitivity may be obtained by first writing for Equation 2 the approximate equation which holds as $w \to 0$ for the approach of $d$ to $d_1$, namely:

$$(4) \quad 8Z \cdot d^3 = M \cdot \cos w \left[(1+K)^{-\frac{3}{2}} + 1\right]$$

Differentiating (4) there is obtained:

$$(5) \quad \frac{dw}{dZ} = -\frac{1}{Z \cdot \tan w}$$

In this $$\frac{dw}{dZ}$$

is the sensitivity, i. e. the change in $w$ for a unit change in $Z$. As will be evident, as $w \to 0$ (as $d \to d_1$) the sensitivity becomes extremely great. As an example, for a setting of $d$ such that $w$ is $3°\ 15'$, $dw=1°$ for $$\frac{dZ}{Z} = 0.001$$

A minute change in $Z$ is therefor easily detectible by accurate measurement of $w$.

It will now be evident that $d$ must be made adjustable and $w$ must be measurable to a high degree of accuracy if accurate determinations of $Z$ are to be made. In practice, of course, $d$ must be sufficiently less than $d_1$ to secure fidelity of readings, for example $d$ may be practically taken about equal to $$\frac{d_1}{2}$$

Figure 6:
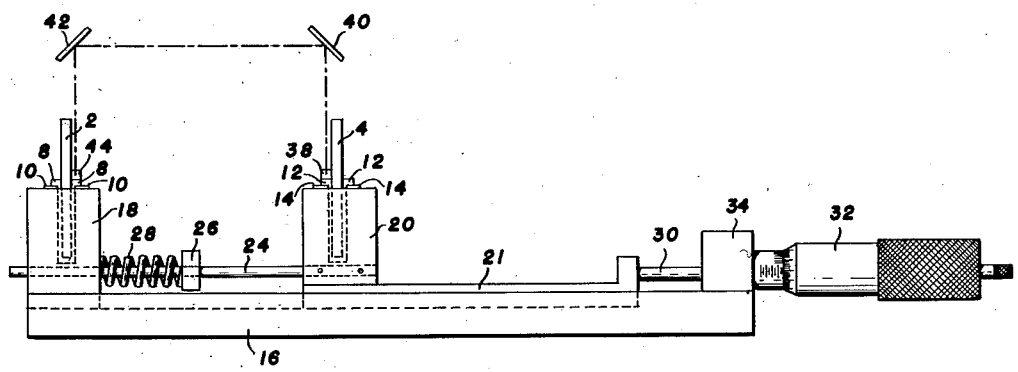
Figure 6 is a side elevation of the same.
Figure 7:
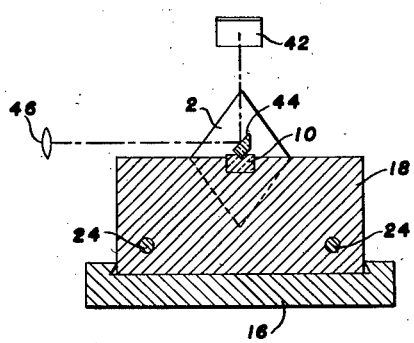
Figure 7 is a vertical section taken on the plane indicated at 7—7 in Figure 5.

From the foregoing and taking into consideration the high sensitivity which may be involved it will be evident that the system must be constructed and adjustable to a high degree of precision and should be enclosed in a thermostatically controlled, preferably evacuated, box so as to reduce to a negligible degree the effects of varying ambient temperatures. The system must, of course, also be leveled and oriented to a precise degree. These matters of thermostatic control and accurate leveling and orientation are common in magnetometers and, consequently, they will not be specially described herein. However, there may be described with reference to Figures 5, 6 and 7 certain matters of construction leading to attainment of the possibility of precise measurement.

The needles 2 and 4 are provided with knife edges 8 and 12, the edges of which pass precisely through the centers of gravity of the moving needle assemblies. The knife edges are supported on agate supports 10 and 14 having cylindrical depressions therein which will serve to insure coaxial mounting of the needles. These agate supports are mounted in blocks 18 and 20, the former of which is secured in fixed position to a base 16. The support 20 is carried by a slide 21 which has a dovetail mounting as indicated at 22 in the base 16 so as to be movable lengthwise of the axis about which the needles oscillate. Rods 24 secured in the support 20 are provided with collars 26 between which and the support 18 there act strong compression springs to force the slide 21 against the spindle 30 of a micrometer 32 mounted in a block 34 secured to the base 16. By reason of this adjustment the dimension $2d$ may be very accurately set, the needles being set on their agate supports in precise relationship thereto through the use of the conventional devices which are commonly used to lift needles from their supports and hold them against oscillation to avoid possible damage when the apparatus is undergoing transportation. These devices may also have embodied in them in conventional fashion conductive plates in which there will be inducted eddy currents when the needles oscillate so as to effect damping of the oscillations.

The reading to a high degree of accuracy of the angles $w$ may be effected in various ways of which one is illustrated. This involves the provision of a fixed member 36 carrying a scale which may be observed by a telescope conventionalized as a lens 46, the optical path including a mirror 38 carried by one of the knife edges of the needle 4, a pair of fixed mirrors 40 and 42 and a mirror 44 carried by one of the knife edges of the needle 2. The displacement of index markings on the member 36 with respect to cross hairs in the telescope will then serve for accurate determination of the angles $w$.

From the foregoing description it will be evident that by the use of proper adjustments and manipulations of the apparatus either the total value of the vertical component of the earth's field or changes in this value may be measured. It will also be evident that the system may be otherwise used than as heretofore indicated. For example, if the axis of rotation is placed horizontal and perpendicular to the magnetic meridian so that the needles oscillate in the plane of the magnetic meridian the total intensity of the earth's magnetic field will act on them and may thus be measured. In this case their positions of equilibrium will be characterized by the fact that the bisector of the angle they form with each other is directed along the vector of total intensity. The equations heretofore given will, of course, apply except that the total intensity of the field will be substituted for the vertical component $Z$ heretofore mentioned. The magnetometer may be used in aerial surveys and if photoelectric reading devices are used continuous indications of the field's measure may be automatically recorded.

In the arrangement so far described both needles are capable of oscillation. It will be evident, however, that one of the needles could be fixed with its pole axis vertical in which case the angle $w$ made by the oscillating needle will alone be variable. Still better is an arrangement such as indicated in Figure 8 in which there is one free needle 48 oscillating between a pair of fixed needles 50 and 52, all of these needles being coaxial. In this arrangement if the fixed needles are identical and the free needle is midway between them, there will be no axial component of force on the free needle, simplifying mounting. The fixed needles must be vertical if the vertical component $Z$ of the field is to be measured. However, if the total intensity vector is to measured the fixed needles must be arranged with their pole axes parallel to the local intensity vector. It will be evident that there will then apply equations similar to, but somewhat different from, those given above. The arrangement involving the three needles has the advantage in prospecting on land since for the fixed needles there can be adopted magnetic moments as great as desired permitting the use of greater spacing between them, i. e., the fixed needles may be quite large and different from the movable needle. In particular, such an apparatus is useful in registering diurnal variations of the magnetic field, the knowledge of which is necessary for correct reading of anomalies observed from aircraft with the aid, for example, of the apparatus involving only two needles. This two-needle system is preferable for aircraft surveys since it will easily adjust itself to the oscillations of the aircraft.

Further modifications will be readily apparent and may be used depending upon particular requirements. For example, a pair of rotatable needles may be mounted between a pair of fixed needles, all being coaxial. Or a central fixed needle may be associated with a group of rotatable needles disposed about it and rotating on axes at right angles to each other intersecting at the center of the fixed needle; or the fixed needle may be midway between a pair of needles rotatable about a common axis perpendicular to the magnetic axes of all three needles.

Still further modifications of the invention may be attained by using permanently magnetized needles which, when mounted alone, will orient themselves with their length in an east-west direction rather than a north-south direction. Such needles may be formed of the composition or alloy known as "silmanal" which, for example, may contain 86.75% silver, 8.80% manganese, and 4.45% aluminum. A needle of silmanal may be permanently magnetized transversely and under these conditions it will have, in effect, east and west poles. As will then be evident, all of the foregoing considerations may be applied to such needles, merely taking their orientation into account: for example in a two needle system of pivotally mounted silmanal needles, their common axis of rotation will be in the magnetic meridian and the angle $w$ used above will be measured as a deflection from a horizontal plane; or if a system of two fixed silmanal needles and an intermediate pivoted silmanal needle is used, the common axis will be in the magnetic meridian and the fixed needles will be oriented in a horizontal east-west direction. It will also be evident that systems may be used involving ordinary north-south seeking needles in combination with such east-west seeking needles, utilizing the same principles of operation in a critical region of confluence of two equilibria. By the term "permanently magnetized" as used herein there will accordingly be understood the condition of permanent polarization of both types of needles.

What I claim and desire to protect by Letters Patent is:

1. In combination, a pair of permanently magnetized needles, means mounting at least one of said needles for oscillation about a common axis of the needles perpendicular to the magnetic axes of both, the spacing between said needles being less than, but approximately, a critical distance as given by Equation 3 in the foregoing specification, and means for accurately adjusting the spacing between the needles.

2. In combination, a pair of permanently magnetized needles, means mounting at least one of said needles for oscillation about a common axis of the needles perpendicular to the magnetic axes of both, the spacing between said needles being less than, but approximately, a critical distance as given by Equation 3 in the foregoing specification, means for accurately adjusting the spacing between the needles, and means for indicating changes of the angle between said magnetic axes.

3. In combination, a pair of permanently magnetized needles, means mounting both of said needles for oscillation about a common axis of the needles perpendicular to the magnetic axes of both, the spacing between said needles being less than, but approximately, a critical distance as given by Equation 3 in the foregoing specification, and means for accurately adjusting the spacing between the needles.

4. In combination, a pair of permanently magnetized needles, means mounting both of said needles for oscillation about a common axis of the needles perpendicular to the magnetic axes of both, the spacing between said needles being less than, but approximately, a critical distance as given by Equation 3 in the foregoing specification, means for accurately adjusting the spacing between the needles, and means for indicating changes of the angle between said magnetic axes.

5. In combination, a pair of permanently magnetized needles, and means mounting one of said needles for oscillation about a common axis of the needles perpendicular to the magnetic axes of both, the other of said needles being fixed relative to said common axis, the spacing between said needles being less than, but approximately, a critical distance as given by Equation 3 in the foregoing specification.

6. In combination, a pair of permanently magnetized needles, means mounting one of said needles for oscillation about a common axis of the needles perpendicular to the magnetic axes of both, the other of said needles being fixed relative to said common axis, the spacing between said needles being less than, but approximately, a critical distance as given by Equation 3 in the foregoing specification, and means for accurately adjusting the spacing between the needles.

7. In combination, a pair of permanently magnetized needles, means mounting one of said needles for oscillation about a common axis of the needles perpendicular to the magnetic axes of both, the other of said needles being fixed relative to said common axis, the spacing between said needles being less than, but approximately, a critical distance as given by Equation 3 in the foregoing specification, and means for indicating changes of the angle between said magnetic axes.

8. In combination, a pair of permanently magnetized needles, means mounting one of said needles for oscillation about a common axis of the needles perpendicular to the magnetic axes of both, the other of said needles being fixed relative to said common axis, the spacing between said needles being less than but approximately, a critical distance as given by Equation 3 in the foregoing specification, means for accurately adjusting the spacing between the needles, and means for indicating changes of the angle between said magnetic axes.

9. In combination, three coaxial permanently magnetized needles, the two outer needles being fixed relative to their common axis, and means mounting the middle one of said needles between the outer needles for oscillation about said common axis, the common axis being perpendicular to the magnetic axes of all three needles, the spacing between said needles being less than, but approximately, a critical distance as given by Equation 3 in the foregoing specification.

10. In combination, three coaxial permanently magnetized needles, the middle one being fixed relative to their common axis, and means mounting the two outer needles for oscillation about said common axis, the common axis being perpendicular to the magnetic axes of all three needles, the spacing between said needles being less than, but approximately, a critical distance as given by Equation 3 in the foregoing specification.

ERVAND G. KOGBETLIANTZ.

REFERENCES CITED

The following references are of record in the file of this patent:

UNITED STATES PATENTS

| Number    | Name       | Date          |
|-----------|------------|---------------|
| 1,701,603 | Bauer et al. | Feb. 12, 1929 |
| 1,976,636 | Roux       | Oct. 9, 1934  |
| 2,123,045 | Hoare      | July 5, 1938  |
| 2,461,864 | Zuschlag   | Feb. 15, 1949 |

FOREIGN PATENTS

| Number  | Country | Date          |
|---------|---------|---------------|
| 248,539 | Germany | June 25, 1912 |
| 440,899 | Germany | Feb. 17, 1927 |